(12) United States Patent
Batzinger et al.

(10) Patent No.: US 6,680,454 B1
(45) Date of Patent: Jan. 20, 2004

(54) ELECTROMACHINING WITH PERFORATED ELECTRODES

(75) Inventors: Thomas James Batzinger, Burnt Hills, NY (US); Bin Wei, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/248,216

(22) Filed: Dec. 27, 2002

(51) Int. Cl.⁷ .................................. B23H 7/22
(52) U.S. Cl. .............. 219/69.15; 205/653; 205/665; 219/69.14; 219/69.17
(58) Field of Search ............... 205/653, 665; 219/69.14, 69.15, 69.2, 69.17

(56) References Cited

U.S. PATENT DOCUMENTS 3,725,631 A * 4/1973 Angelucci et al.
4,134,807 A * 1/1979 Briffod
5,763,843 A * 6/1998 Yuzawa et al.

FOREIGN PATENT DOCUMENTS

| JP | 61-44531 A | * | 3/1986 | |
| JP | 1-289616 A | * | 11/1989 | |
| SU | 848238 | * | 7/1981 | 219/69.15 |
| SU | 1825677 A1 | * | 7/1993 | 219/69.14 |

* cited by examiner

*Primary Examiner*—Geoffrey S. Evans
(74) *Attorney, Agent, or Firm*—Penny A. Clarke; Patrick K. Patnode

(57) ABSTRACT

A perforated electrode has strategically distributed flushing holes through which a flushing medium is discharged. The electrode can be used for either electrochemical machining (ECM) or electrodischarge machining (EDM). The flushing medium is either electrolyte in ECM or a dielectric fluid in EDM. It is discharged from the tool electrode directly against the workpiece surface or surfaces which are undergoing material removal. This removes heat and sludge or debris.

11 Claims, 3 Drawing Sheets

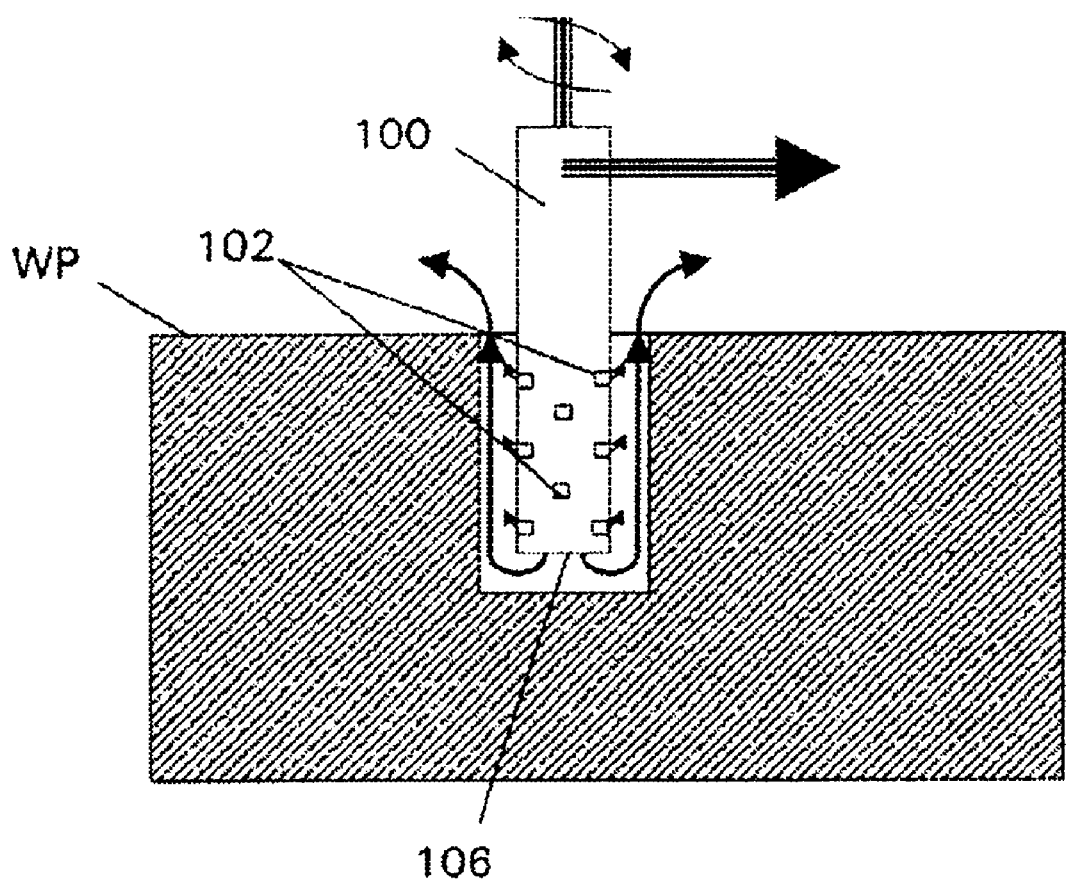

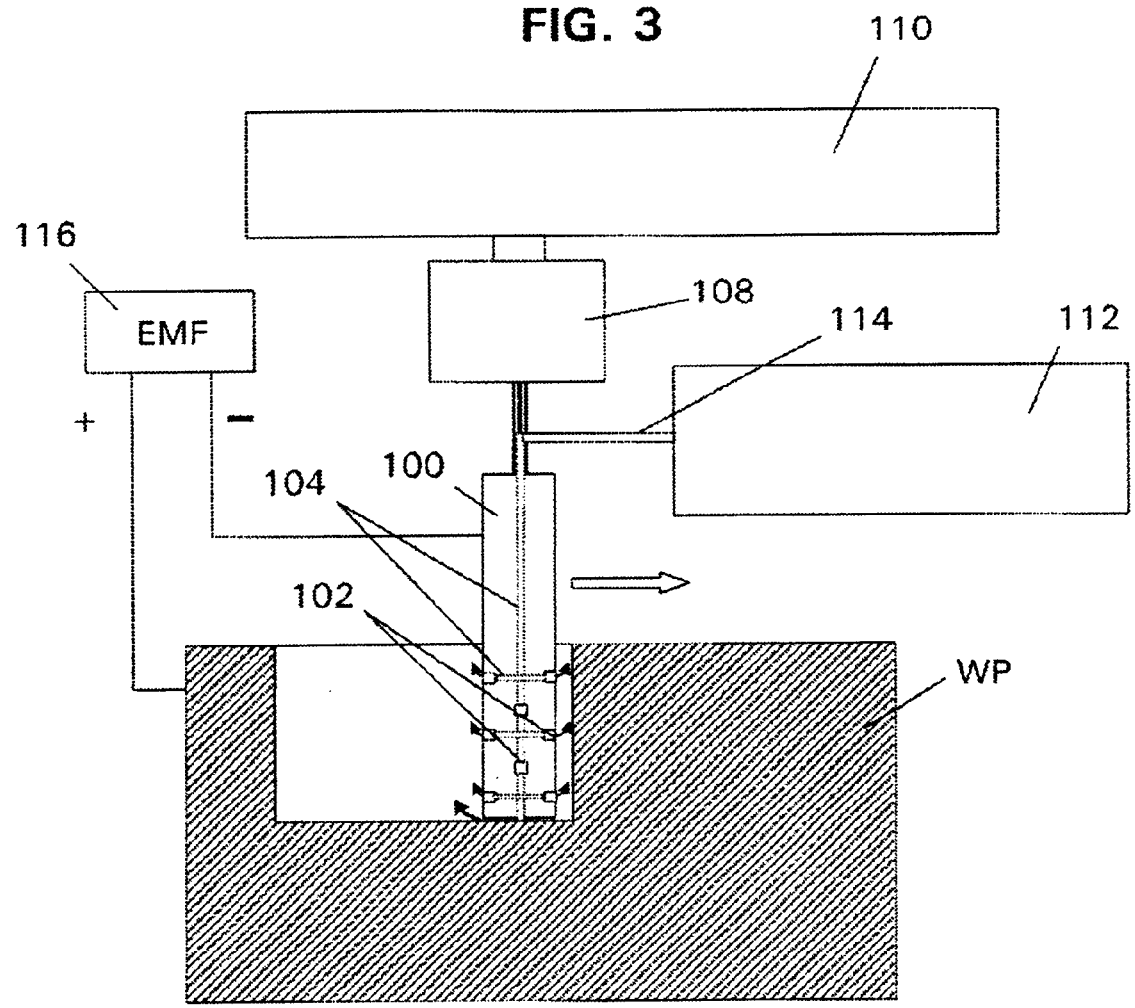

ELECTROMACHINING WITH PERFORATED ELECTRODES

BACKGROUND OF THE INVENTION

The present invention relates generally to EDM (electrodischarge machining) or ECM (electrochemical machining) and more specifically to a perforate tool electrode which can be used for plunge drilling, side milling, and end milling.

Electromachining processes such as electrochemical machining (ECM) and electrodischarge machining (EDM) and their combinations use electrically-conductive electrodes, for example, electrode 10 shown in FIG. 1. With this type of machining, it is necessary to flush the machining zone with a fluid medium 12. In ECM this fluid medium is an electrolyte while in the case of EDM it is a dielectric fluid. The fluid medium 12 is induced to flow past the electrode/tool 10 and the surfaces of the workpiece (WP) undergoing electro-erosion (with EDM) or electrochemical dissolution (with ECM).

Uniform and adequate flushing is needed to replenish machining zones with fresh medium and to carry away heat and sludge. Flushing accordingly has a direct effect on electromachining performance. When high speed electromachining is pursued, inadequate flushing tends to lead to process instability and limits the achievable metal removal rate.

When a conventional solid electrode is used, working medium flushing is carried out by using an external nozzle or using flow channels specially designed to introduce the medium to machining zones. Conventional external nozzles or flow channels may not be sufficient in some high speed machining applications.

SUMMARY OF THE INVENTION

A first aspect of the invention resides in an electromachining device comprising: a perforated electrode through which a fluid is discharged.

A second aspect of the invention resides in a method of electromachining comprising the steps of: passing a flow of fluid through a perforated electrode; moving the electrode into a work piece so that the flow of fluid provides an adequate amount of medium uniformly over the entire desired machining zones to ensure high speed, stable electromachining of material from the work piece.

A further aspect of the body resides in an electrode for electromachining comprising: a body; a passage structure formed in the body; and holes formed in the peripheral surface of the body through which fluid from the passage structure can flow.

BRIEF DESCRIPTION OF THE DRAWINGS

FIG. 2 is a schematic sectional view showing plunge drilling/side machining being carried out using a perforated electrode.

FIG. 3 is a schematic sectional view showing side machining being carried out with a perforated electrode.

DETAILED DESCRIPTION OF THE PREFERRED EMBODIMENTS

Figure 1:
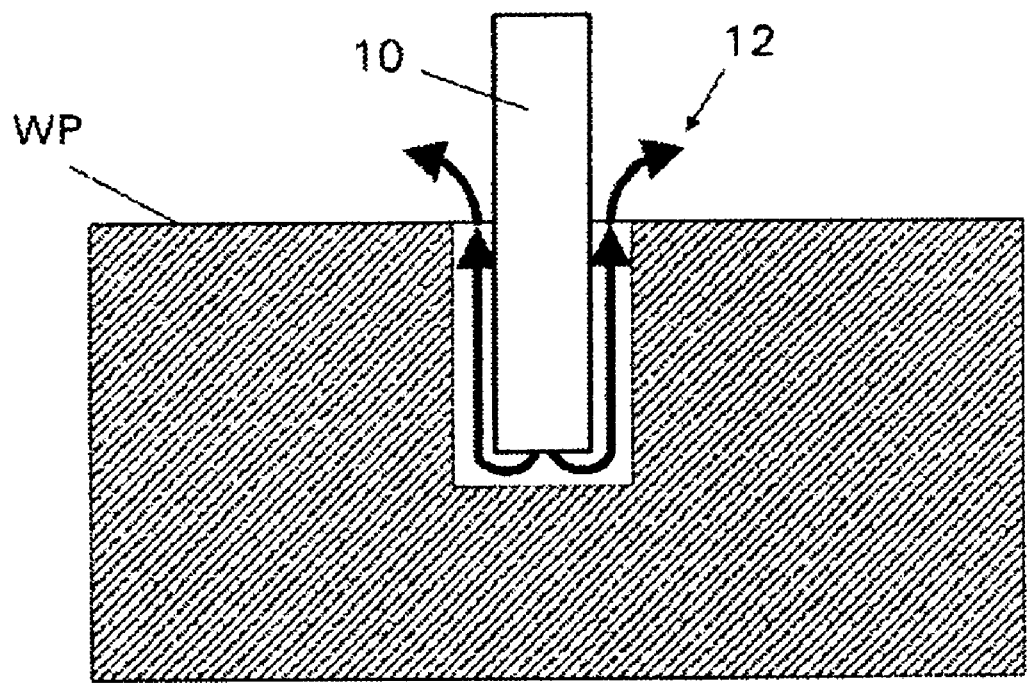
FIG. 1 is a schematic sectional view depicting a prior art type plunge drilling technique.

In brief, the invention is directed to a perforated electrode which has strategically distributed flushing holes through which a flushing medium is discharged. The electrode can be used for either electrochemical machining (ECM) or electrodischarge machining (EDM). The flushing medium is either electrolyte in ECM or a dielectric fluid in EDM. The flushing medium is discharged from the electrode directly against the workpiece surface or surfaces which are undergoing material removal. The fluid flow provides uniform and adequate amount of medium for electromachining and removes heat and sludge from the machining zone. The electrode can be rotatable and/or reciprocal (viz., induced to undergo repetitive movement) or moved through the work piece without repetitive movement. The shape of the electrode can be varied as desired/necessary.

FIGS. 2 and 3 schematically show embodiments of the invention. FIG. 2 shows a perforated electrode or cutting tool 100 which has multiple holes 102 in its surface. For the sake of illustrative simplicity, the electrode 100 is shown as having a simple cylindrical shape. The electrode 100, however, may have shapes other than cylindrical, such as conical, for example.

The holes 102 are connected to medium supply channels 104 (see FIG. 3) formed in the interior of the electrode. The liquid medium is vented out through the holes 102 and is discharged into direct contact with machining zones where material is being removed from the work piece (WP).

The holes 102 are strategically distributed based on the particular need of medium flushing on the work piece (WP). Additional holes (not shown) are formed in the terminal end 106 of the electrode of tool 102 so as to flush out the blind end of the bore or opening being formed in the work piece (WP). However, the holes 102 are predominantly placed in the areas of the electrode facing the workpiece surface areas to be machined.

Hole density, size, shape and distributions are based on the amount and location of flushing needed in workpiece areas as well as the minimum medium leakage which occurs from non-machined areas. Since the medium can be directly supplied to machining zones where it is needed, rather than to larger areas including non-essential areas, such as tends to occur when using external nozzles and other indirect flow channels such as depicted in FIG. 1, flushing of the material being removed from the work piece (WP) is rendered more effective.

Perforated electrodes/tools 100 improve the flushing in machining zones and improve machining performance by effectively carrying away heat and sludge. The improved flushing greatly improves process stability and metal removal rate, especially with high speed electromachining processes or electromachining processes that use rotating electrodes, such as electrochemical milling or electrodischarge milling.

The perforated electrodes according to the present invention can also help further improve the performance by creating beneficial interruptive effects in the interelectrode gap regions such as the effect obtained by using the pulsating current due to the electrode surface perforation. This can be achieved by alternating the proximity of the tool and workpiece at locations when tool surface areas with holes and tool surface areas without holes face a certain workpiece areas alternatively due to tool rotation.

FIG. 3 shows an example of a perforated electrode or tool 100 being applied to side machining. The electrode 100 is connected with rotational motion device such as a spindle 108 which is carried on a support/positioning device 110 adapted to move the electrode 100 along a predetermined path which can include displacement along three mutually perpendicular axes or with additional rotary NC axes. This displacement can be numerically controlled (NC) as required.

The electrode 100 is connected with a source of fluid under pressure 112. In this embodiment the cutting process is ECM based, and electrolyte is supplied to the electrode via conduit 114. A source of EMF 116 is connected across the electrode 100 and the workpiece (WP). In the case of EDM a dielectric flushing fluid would be used in palce of an electrolyte.

While this invention has been disclosed with reference to only a limited number of embodiments, the various modifications and variations that can be envisaged and produced by a person of skill in the art to which the invention pertains or most closely pertains, will be self-evident given the proceeding disclosure. The scope of the invention is limited only by the appended claims.

What is claimed is:

1. An electromachining device comprising:
    a perforated electrode having a plurality of perforations through which a fluid is discharged,
    wherein the perforations comprise a plurality of holes, a first subset of the holes extending along a side of the perforated electrode for facing a work piece surface being machined, and a second subset of the holes being located on an end of the perforated electrode, and
    wherein the perforated electrode further comprises at least one internal passage structure via which the fluid is supplied to the holes.

2. An electromachining device as set forth in claim 1, wherein the perforated electrode is adapted for electrochemical machining.

3. An electromachining device as set forth in claim 1, wherein the perforated electrode is driven to execute repetitive movement with respect to a work piece.

4. An electromachining device as set forth in claim 3, wherein the perforated electrode is adapted for at least one of plunge drilling and side machining of the work piece.

5. An electromachining device as set forth in claim 1, wherein the perforated electrode is adapted for electrodischarge machining.

6. An electromachining device as set forth in claim 1, further comprising a device for moving the electrode with respect to a work piece.

7. An electromachining device as set forth in claim 1, wherein the perforations are adapted to establish interruptive conditions in a zone where cutting of a workpiece is being carried out by alternating the proximity of the perforated electrode to the workpiece at a plurality of locations when at least one area of a surface of the perforated electrode with holes and at least one area of the surface of the perforated electrode without holes face a certain area of the workpiece alternatively due to rotation of the perforated electrode.

8. A method of electromachining comprising the steps of:
    passing a flow of fluid through a perforated electrode and out of a plurality of holes formed along a side of the perforated electrode and facing a work piece and formed on an end of the perforated electrode; and
    moving the electrode into the work piece so that the flow of fluid removes material from the work piece, the material being flushed away by the fluid.

9. An electrode for electromachining comprising:
    a body;
    at least one passage structure formed in the body; and
    a plurality of holes formed in a peripheral surface of the body through which fluid from the passage structure can flow, the holes being positioned along the peripheral surface to face a work piece surface during electromachining operations, and formed in an end surface of the body for flowing fluid from the passage structure out the end surface.

10. An electrode as set forth in claim 9, wherein the body is adapted to be translated in at least a direction substantially normal to the axis about which the body is rotatable.

11. An electrode as set forth in claim 9, wherein the body is adapted to be rotated by a rotation mechanism.

* * * * *